United States Patent [19]

Winslow, Jr. et al.

[11] Patent Number: 5,034,210
[45] Date of Patent: Jul. 23, 1991

[54] METHOD OF REDUCING ETHYLENE OXIDE EMISSIONS

[75] Inventors: Charles E. Winslow, Jr., Norfolk; Joseph L. Bush, Chesapeake, both of Va.

[73] Assignee: Hoechst Celanese Corporation, Somerville, N.J.

[21] Appl. No.: 525,397

[22] Filed: May 18, 1990

Related U.S. Application Data

[63] Continuation-in-part of Ser. No. 355,507, May 23, 1989, abandoned.

[51] Int. Cl.$^5$ .................. C01B 17/66; B01D 53/34
[52] U.S. Cl. ..................... 423/515; 423/226; 423/245.1; 423/245.2; 55/84
[58] Field of Search ............ 423/245.1, 245.2, 210, 423/226, 515, 516; 55/84

[56] References Cited

U.S. PATENT DOCUMENTS 4,112,054  9/1978  Feingold et al. ............... 423/245.2
4,517,167  5/1985  Popescu et al. ................ 423/245
4,540,552  9/1985  Ream et al. .................... 423/226
4,622,216  11/1986 Winslow, Jr. et al. ........... 423/515

FOREIGN PATENT DOCUMENTS 2093726  9/1982  United Kingdom ................ 55/84

OTHER PUBLICATIONS

Solomons, *Organic Chemistry*, 2nd Ed., John Wiley & Sons, 1980, pp. 306-308.

Primary Examiner—Gary P. Straub
Assistant Examiner—Stephen G. Kalinchak
Attorney, Agent, or Firm—Depaoli & O'Brien

[57] ABSTRACT

Vent gas from the condenser-scrubber system of a reactor, in which dithionites are made by reacting a formate, sulfur dioxide, and an alkali in aqueous methanol, is reduced in its ethylene oxide content to less than 10 ppm maintaining the ratio of sulfur dioxide to ethylene oxide entering the scrubber to greater than 1.0, preferably greater than 2.5, and most preferably greater than 3.0 and at a temperature of −20° C. to 0° C.

5 Claims, No Drawings

METHOD OF REDUCING ETHYLENE OXIDE EMISSIONS

CROSS-REFERENCE TO RELATED APPLICATIONS

This application is a continuation-in-part of U.S. Ser. No. 07/355,507, filed May 23, 1989, now abandoned.

BACKGROUND OF THE INVENTION

1. Field of the Invention

This invention relates to the manufacture of anhydrous alkali dithionites by reacting an alkaline formate, an alkali metal agent, and sulfur dioxide in an alcohol/water solvent to which is added ethylene oxide as a selected thiosulfate-reactive organic compound. It particularly relates to removal of ethylene oxide from the vent gases of the dithionite reaction.

2. Review of the Prior Art

In U.S. Pat. No. 4,622,216 (the entire disclosure herein incorporated by reference), a batch reaction method is taught for increasing the yield of anhydrous sodium dithionite by adding an organic compound that is thiosulfate reactive to a batch reactor containing a puddle solution of methanol and fed with formic acid or an alkali formate as a first feed, an aqueous alkali compound as a second feed, an aqueous alkali formate solution as a third feed, and a methanolic $SO_2$ solution as a fourth feed. This organic compound may be added prior to, combined with, or concurrently with one of the four feeds to the reactor but is preferably added concurrently with the third feed and throughout the entire course of the reaction ending with the beginning of the cooling period, at an addition rate of 0.4-0.7 weight percent per minute, preferably at 0.5 wt. %/minute. Almost all of the organic compound is consumed, and at least a portion of the thiosulfate ion is destroyed.

The organic compound is selected from the group consisting of epoxy compounds having the formula

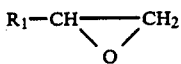

or halogenated hydrocarbons having the general formula $R_2X$ or $XR_2X$, $R_1$ being hydrogen, an alkyl group containing from 1 to 8 carbon atoms, a halogenated alkyl group containing 1 to 2 carbon atoms, a phenyl group, or a substituted phenyl group. The compounds represented by this formula include ethylene oxide, propylene oxide, butylene oxide, epichlorohydrin, epibromohydrin, and styrene oxide. $R_2$ is a primary or secondary alkyl group containing from 1 to 8 carbon atoms, an allyl group or a 2-methylallyl or 2-ethylallyl group, and X is a halogen atom.

An important part of using ethylene oxide for manufacturing sodium dithionite, as described in U.S. Pat. No. 4,622,216, is the determination of ethylene oxide released to the atmosphere to protect the health and safety of plant personnel and neighboring communities. The Federal Office of Safety and Health Administration (OSHA) had established a permissable exposure limit for employees of 1 ppm ethylene oxide (vol./vol. basis), measured as an eight-hour, time weighted average, and an action level of 0.5 ppm.

It should be immediately obvious that the lower the ethylene oxide concentration is in the vent gas the better are the chances that governmental regulations will be met. Various states and local jursidictions have or are contemplating regulations of ethylene oxide emissions.

Although there are no standards for the weighted average ethylene oxide concentration in the vent gas, nevertheless, it has been found that when the vent gas contains ethylene oxide at 300 ppm, various state and location regulations are not met. However, when the vent gas contains no more than 10 ppm ethylene oxide compliance with regulations is met.

As can be appreciated many complicated factors such as wind direction, air dilution, etc. must be taken into consideration when calculating atmospheric ethylene oxide concentration so it is indeed advantageous to have a method which controls the amount of ethylene oxide in the vent gas thereby insuring compliance with safety regulations.

While practicing the process of said U.S. Pat. No. 4,622,216, samples were taken of the gas in the headspace of the trial reactor and of the vent gas, largely carbon dioxide, as it left the system after passing through the vent gas condensers and scrubber.

Analysis of these samples revealed that the headspace gas averaged 3,000 ppm of ethylene oxide and that the vent gas averaged 300 ppm. These findings were of concern since the bulk of the vented carbon dioxide is customarily compressed, stored in a tank, and later used for various purposes in the plant before being released to the atmosphere. The excess over this needed amount is released directly to the atmosphere. In either case, it seemed possible that suitable atmospheric conditions could cause this released gas to enter the workplace and create an ethylene oxide exposure hazard.

Carbon dioxide is produced continuously throughout the course of the dithionite-making reaction as shown by the overall chemical equation

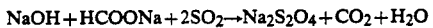

Since carbon dioxide is evolved continuously, it must be released from the reactor continuously in order to maintain a constant reactor pressure. The carbon dioxide in the headspace is saturated at reactor conditions of temperature and pressure with all of the various volatile components contained in the reactor: methanol, methyl formate, water and sulfur dioxide. In order to prevent the escape of the valuable materials from the reactor system, the carbon dioxide leaving the headspace passes first through a water cooled condenser, secondly through a glycol chilled condenser, and thirdly up through a scrubber which is fed at the top with glycol chilled methanol. The condensate from the two condensers and the liquid underflow from the scrubber all combine and return by gravity flow to the dithionite reactor. The entire condenser-scrubber system operates at full reactor pressure.

When ethylene oxide is used in the dithionite process as in U.S. Pat. No. 4,622,216, it, being a volatile material, becomes a component of the headspace gas. As previously noted, the described condenser-scrubber system operating in the described manner, effected a reduction in ethylene oxide concentration from 3000 ppm in the headspace gas to 300 ppm in the gas leaving the top of the scrubber. While this represents a 90% removal of ethylene oxide, the residual average concentration of 300 ppm is considered to be too high for safe plant operation and/or compliance with local, state or federal regulations.

Although the carbon dioxide is evolved continuously throughout the entire reaction, the rate of evolution varies. Approximately 56% of the total amount of carbon dioxide is released during the major raw material feed period, the first 65 minutes, 28% during the second 65 minutes, and 16% during the last 65 minutes. The concentration of ethylene oxide in the headspace gas remains more or less constant at 3000 ppm throughout the entire reaction. Therefore, the mass flow of ethylene oxide to the condenser-scrubber system varies over the course of the reaction just as the mass flow of carbon dioxide does, 56% in the first 65 minutes, 28% in the second, and 16% in the third. For simplicity of instrumentation and control, the flow of scrubber methanol is maintained constant over the entire course of the reaction. This has been an adequate procedure to prevent valuable material loss prior to the use of ethylene oxide.

SUMMARY OF THE INVENTION

It is accordingly an object of this invention to provide a method for safely venting gas from a dithionite manufacturing process in which ethylene oxide (EO) is used.

It is another object to reduce the ethylene oxide emission level to no more than 10 ppm on a vol./vol/basis.

It is another object to accomplish the reduced ethylene oxide emission level using only chemicals indigenous to the current sodium dithionite process, and, further, to use the allowable chemicals in such a way as to have no adverse effect on the sodium dithionite quantity or quality.

In accordance with these objects and the principles of this invention, it has surprisingly been discovered that the ethylene oxide in the carbon dioxide reacts on a molar basis and at great speed with the sulfur dioxide in the methanol feeding the scrubber. Even more surprisingly, it has been found that this fast reaction occurs at temperatures as low as $-20°$ C. to $0°$ C.

The method of this invention accordingly comprises:

Adding to the condenser-scrubber system of the reactor a scrubber methanol stream that contains a sufficient amount of absorbed sulfur dioxide such that the molar ratio of sulfur dioxide: ethylene oxide is greater than 1.0 and preferably greater than 2.5.

This method preferably comprises adding these materials at a molar ratio of sulfur dioxide: ethylene oxide that is at least about 2.5 and more preferably at a ratio of at least about 3.0. The scrubber methanol stream suitably contains 0.3–0.35% sulfur dioxide but preferably contains up to 1.0% sulfur dioxide. For a batch reaction, the method further comprises adding the scrubber methanol according to a specific schedule that is synchronized with the feed rate of evolved carbon dioxide to the condenser-scrubber system.

On a weight basis and at steady-state feed rates, this schedule comprises adding about 56% of the scrubber methanol during the first 65 minutes of the batch reaction for manufacturing sodium dithionite at a feed rate of about 0.86 wt. %/min., about 28% of the scrubber methanol during the next 65 minutes at feed rate of about. 0.43 wt. %/min., and about 16% of the scrubber methanol during the final 65 minutes at a feed rate of about 0.25 wt. %/min. Preferably, the schedule comprises adding an increased amount of scrubber methanol, about 88% of the total feeding during the first 130 minutes at a feed rate of about 0.68 wt. %/min. and about 12% of the scrubber methanol feeding during the final 65 minutes at a feed rate of about 0.18 wt. %/min.

Further scrutiny of the data generated showed that while the overall average concentration of ethylene oxide in the vent gas was 300 ppm, the concentration was drastically lower, 2 ppm, during the last 65 minutes of the reaction than during the first or second 65 minute periods, 420 ppm and 220 ppm, respectively. It was not thought possible that the increased liquid to gas ratio prevailing in the scrubber during the third 65 minute period could alone account for the drastic reduction in ethylene oxide concentration occurring during that time. Additional calculations showed that the molar ratio of sulfur dioxide in the methanol entering the scrubber to the ethylene oxide in the carbon dioxide entering the scrubber in the first, second, and third 65 minute periods was 0.44:1, 0.88:1, and 1.54:1, respectively. Although Ream et al, U.S. Pat. No. 4,540,522, teach the reaction of ethylene carbonate which is stated to decompose to ethylene oxide with various acid gases such as $SO_2$, such reaction is taught to occur at temperatures between $50°$ and $100°$ C.

In the instant invention, when the molar ratio of sulfur dioxide to ethylene oxide was greater than one, the ethylene oxide was essentially eliminated from the gas. Surprisingly, this reaction is quite rapid at the $-20°$ C. to $0°$ C. (typically $-5°$ C.) temperature in the scrubber. Presumably, this same scrubbing medium, sulfur dioxide dissolved in methanol, would be equally effective in scrubbing ethylene oxide from any gas stream.

DESCRIPTION OF THE PREFERRED EMBODIMENT

To prove the hypothesis that the sulfur dioxide in the scrubber methanol is responsible for the removal of ethylene oxide in the carbon dioxide stream leaving the reactor, a scrubber methanol containing 1% sulfur dioxide was substituted for the usual 0.3% sulfur dioxide concentration. The total feed quantity and rates of feed were left unchanged as compared to the usual baseline case producing an average ethylene oxide concentration of 300 ppm in the vent gas. With the 1% sulfur dioxide concentration in the scrubber methanol, the average ethylene oxide concentration in the vent gas decreased to 6.7 ppm, proving that the increased sulfur dioxide concentration in the scrubber methanol was responsible for ethylene oxide removal.

The details of these two modes of operation are listed in the following table. In the table, the baseline condition using scrubber methanol containing 0.3% sulfur dioxide is shown as Example 1, while the modified scrubber methanol containing 1% sulfur dioxide is shown in Example 2.

Also shown in the table are Examples 3 and 4. In Example 3 the same total quantity of scrubber methanol containing 1% sulfur dioxide was employed as in Example 2, but the feed schedule of the scrubber methanol was adjusted such that the sulfur dioxide fed to the scrubber was matched with the ethylene oxide fed to the scrubber in the carbon dioxide stream leaving the reactor. In Example 4, an increased total quantity of scrubber methanol containing 1% sulfur dioxide was employed. This quantity was distributed so as to counteract the larger than desired residual concentration of ethylene oxide during the second 65 minute period encountered in Example 3.

|  | EX.1 | EX.2 | EX.3 | EX.4 |
|---|---|---|---|---|
| 1st 65 min. | | | | |
| lb scrub feed | 23.7 | 23.7 | 39.8 | 39.8 |
| % $SO_2$ | 0.3 | 1.0 | 1.0 | 1.0 |
| lb mol $SO_2$ | 0.00111 | 0.0037 | 0.0062 | 0.0062 |
| lb mo EO | 0.00252 | 0.00252 | 0.00252 | 0.00252 |
| Ratio, $SO_2/EO$ | 0.44 | 1.47 | 2.46 | 2.46 |
| Vent ppm EO | 420 | 11.2 | 0.25 | 0.20 |
| 2nd 65 min. | | | | |
| lb scrub fed | 23.7 | 23.7 | 19.9 | 39.8 |
| % $SO_2$ | 0.3 | 1.0 | 1.0 | 1.0 |
| lb mol $SO_2$ | 0.00111 | 0.0037 | 0.0031 | 0.0062 |
| lb mol EO | 0.00126 | 0.00126 | 0.00126 | 0.00126 |
| Ratio, $SO_2/EO$ | 0.88 | 2.94 | 2.46 | 4.92 |
| Vent ppm EO | 220 | 1.5 | 1.91 | 0.15 |
| 3rd 65 min. | | | | |
| lb scrub fed | 23.7 | 23.7 | 11.4 | 11.4 |
| % $SO_2$ | 0.3 | 1.0 | 1.0 | 1.0 |
| lb mol $SO_2$ | 0.00111 | 0.0037 | 0.0018 | 0.0018 |
| lb mol EO | 0.00072 | 0.00072 | 0.00072 | 0.00072 |
| Ratio, $SO_2/EO$ | 1.54 | 5.13 | 2.50 | 2.50 |
| Vent ppm EO | 2 | 0.04 | 0.15 | 0.10 |
| Overall | | | | |
| Ratio, $SO_2/EO$ | 0.95 | 3.18 | 2.47 | 3.29 |
| Ratio, $SO_2/EO^{(1)}$ | 0.74 | 2.47 | 2.47 | 3.16 |
| Vent ppm $EO^{(1)}$ | 300 | 6.7 | 0.7 | 0.17 |

$^{(1)}$weighted average

The above table clearly illustrates the novel process of this invention in the fact that, in general, the ethylene oxide content in the vent gases decreased with increasing concentration of sulfur dioxide. Reference to the examples will show that there are two calculations for the $SO_2/EO$ ratio one being a straight average of the ratios in each of the three 65 minute periods and the second being a weighted average. As can be seen, 56% of the ethylene oxide is present in the first 65 minutes, 28% is present in the second 65 minutes and only 16% is present in the last 65 minutes. In the specifications and claims, the $SO_2/EO$ ratio refers to the weighted average.

It should be well appreciated that the preferred embodiment of this invention would be to maintain the $SO_2$ to EO mol ratio in each of the 65 minute periods at a level which is greater than 1.0. However, as can well be appreciated, towards the end of the three 65 minute periods it is possible to use slightly lower amounts or even charge no $SO_2$ since towards the end of the last 65 minutes very little ethylene oxide would be present. As such, it is not absolutely necessary to maintain the $SO_2/EO$ ratio during the entire reaction period, although this is definitely preferred.

Thus, the examples illustrate the improved reduction of ethylene oxide from the vent gases by increasing the amount of $SO_2$ relative to EO thereby resulting in a process which has a vent EO content of only 6.7 parts per million (Example 2) down to 0.17 parts per million (Example 4).

What is claimed is:

1. In a method for producing sodium dithionite by reacting formate, sulfur dioxide, ethylene oxide and alkali in aqueous methanol until sodium dithionite is obtained and vent gases comprising carbon dioxide, ethylene oxide, methanol, methyl formate, water and $SO_2$ are formed, the improvement which comprises passing said vent gases to a condenser-scrubber system wherein said gases are condensed and scrubbed with methanol containing sulfur dioxide at a temperature of $-20°$ C. to $0°$ C. while maintaining a molar ratio of sulfur dioxide/ethylene oxide of at least 1.0 in said scrubber so as to reduce the ethylene oxide content of said vent gases.

2. The process of claim 1 wherein the ratio of $SO_2/EO$ is at least 2.

3. The process of claim 1 wherein the ratio of $SO_2/EO$ is at least 2.5.

4. The process of claim 1 wherein the ratio of $SO_2/EO$ is at least 3.

5. The method of claim 1 wherein the scrubbed vent gas contains no more than 10 parts per million ethylene oxide.

* * * * *